United States Patent [19]

Ermer

[11] Patent Number: 4,755,340

[45] Date of Patent: Jul. 5, 1988

[54] METHOD FOR PRODUCING PACKS OF BLADES USED FOR CUTTING CRYSTAL BARS INTO WAFERS

[75] Inventor: Wolfgang Ermer, Hirten, Fed. Rep. of Germany

[73] Assignee: Heliotronic Forschungs- und Entwicklungsgesellschaft fur Solarzellen GmbH, Burghausen, Fed. Rep. of Germany

[21] Appl. No.: 56,326

[22] Filed: May 28, 1987

Related U.S. Application Data

[63] Continuation of Ser. No. 777,023, Sep. 17, 1985, abandoned.

[30] Foreign Application Priority Data

Dec. 20, 1984 [DE] Fed. Rep. of Germany ....... 3446564

[51] Int. Cl.⁴ ................ B29C 33/12; B29C 39/10
[52] U.S. Cl. .................... 264/261; 29/281.1; 29/460; 29/464; 29/527.3; 29/559; 125/16 R; 249/93; 249/95; 264/277; 264/279; 264/294; 269/296
[58] Field of Search ................ 264/261, 272.2, 277, 264/279, 294; 249/93, 95; 269/43, 296; 29/281.1, 460, 464, 527.3, 559; 125/16 R; 83/906

[56] References Cited

U.S. PATENT DOCUMENTS

| | | |
|---|---|---|
| 2,158,229 | 4/1939 | Goldthwaite . |
| 3,168,087 | 2/1965 | Anderson .......................... 125/16 R |
| 3,529,054 | 9/1970 | Hepner ........................ 264/277 X |
| 3,767,155 | 10/1973 | Hovorka ............................ 249/96 |
| 4,079,497 | 3/1978 | Jernigan ...................... 264/261 X |
| 4,165,067 | 8/1979 | Jernigan ...................... 269/296 X |

FOREIGN PATENT DOCUMENTS 1045640 10/1957 Fed. Rep. of Germany .
1427735 7/1964 Fed. Rep. of Germany .
2263118 2/1976 Fed. Rep. of Germany .

Primary Examiner—Jeffery Thurlow
Assistant Examiner—Leo B. Tentoni
Attorney, Agent, or Firm—Burgess, Ryan & Wayne

[57] ABSTRACT

In an apparatus and method for producing packs of blades used for cutting crystal bars into discs, the individual blades are first aligned in the position desired by an assembling jig and then fixed at the end portions thereof by fixing agents, whereby the assembling jig is then removed and the pack of blades is clamped in the holding frame of the reciprocating saw. The apparatus and method makes possible a quick and uncomplicated production of the pack of blades, and eliminates the need for small spacer plates that were hitherto common.

2 Claims, 1 Drawing Sheet

METHOD FOR PRODUCING PACKS OF BLADES USED FOR CUTTING CRYSTAL BARS INTO WAFERS

This application is a continuation of application Ser. No. 777,023, filed Sept. 17, 1985, now abandoned.

BACKGROUND OF THE INVENTION

The present invention relates to a process for producing packs of blades used for cutting crystal bars into wafers.

When cutting crystal bars of semiconductive or oxidic materials such as silicon, germanium, gallium arsenide, indium phosphide, sapphire, ruby or gallium gadolinium garnet, simultaneously into a plurality of wafers by means of multiple cutting processes, the grits that effect the actual abrasion of material are either brought up to on the site of the cutting in a loose state in a slurry (multiple lap cutting) or firmly bonded on the blades. In both modes of operation, a sufficient geometric precision of the cut wafers can only be ensured when the individual blades which combine to form packs of blades are aligned exactly parallel to each other.

As is known, such precise parallel alignment is ensured by inserting small spacer plates at the blade ends between the blades, and then locking such arrangement in position by pressure, for example, as described in the magazine, "Feinwerktechnik" 1962, Number 3, page 87 or by adhesives, as disclosed in German Pat. DE-AS No. 14 27 735 or the corresponding U.S. Pat. No. 3,168,087. However, since the small spacer plates must be precisely made, the production thereof is laborious and expensive. In addition, there is often the danger that the small spacer plates will tilt when inserted or clamped. The use of these conventional procedures results in losses in yield due to deficient cutting precision or mechanical damages to the workpiece such as breaking or cracking.

OBJECTS AND SUMMARY OF THE INVENTION

The present invention solves this problem by providing a process according to which packs of blades for multiple cutting processes with bonded or loose grit can be produced in a simple, less laborious and inexpensive manner.

Basically, solution of the problem is accomplished with an auxiliary tool which spaces the blades such that the blade ends are aligned and locked in position by means of a hardenable adhesive substance and thereafter the auxiliary tool is removed.

The auxiliary tool for aligning the blade ends includes at least one assembling jig which has recesses corresponding to the thickness of the blades and which are arranged exactly parallel to each other. At the same time, it is not as a rule necessary that by means of the auxiliary tool, the blades be aligned parallel over their whole length. It is sufficient in most cases to provide alignment only in the area of the blade ends which are to be secured together. Accordingly, comb-like assembling jigs are preferably used, wherein the thickness of the tenons thereof corresponds to the desired blade spacing while the interspaces between the tenons are equal to the thickness of the blades. The cross-sectional configuration selected for the assembling jig is as a rule rectangular; and a width of from 10–20 mm is in general sufficient to ensure perfect alignment of the blade ends.

The length conveniently corresponds to the width of the desired pack of blades, the depth of the recesses substantially corresponds to the height of the blade. Basically, materials that can be used for the jigs are those that can be exactly processed, and due to their stable shape, dimensional stability and stability to abrasion, allow for frequent utilization. For example, metallic materials such as steels or the like have proved to be satisfactory.

For the alignment, the blades are manually or mechanically inserted in the auxiliary tool. If necessary, the auxiliary tool is then brought to a position which allows the blade ends to project freely over the external edges of the section provided for the fixing operation.

After the alignment operation, the blade ends are locked in the position determined by the auxiliary tool. Suitable fixing agents include hardenable substances having a consistency that make it possible, in the area of the blade ends, to fill in as completely as possible the interspaces between the blades that reliably adhere to the blade material and that have a shearing strength sufficient to withstand the considerable shearing forces that appear during the insertion and sawing. These conditions are specially met by adhesives that can be used for cementing metals that is, especially by a reaction adhesive on a base of epoxy resin, phenol resin or acrylate resin. It is also convenient to use for example, solders of low melting point or fusion adhesives. There are preferably selected fixing agents that harden within a range of from about 15–500 minutes. Substances that harden more quickly sometimes fill the interspaces between the blades incompletely or form enclosures of bubbles that reduce the shearing strength and secureness. Although the use of slow hardening substances is not ruled out, the time required for producing the pack of blades increases considerably.

The adhesion to the blades of the hardenable substances selected can be improved, should that be the case, by additional steps such as roughening and/or careful degreasing of the blade ends, or using agents that impart adhesiveness.

The section on which the area of the blade ends is conveniently surrounded by the hardenable adhesive substance chosen in order to ensure sufficient mechanical stability of the pack of blades essentially depends on the shearing strength of the hardenable adhesive substance (C), on the width of the pack of blades (B) and on the total tension force (F) with which the pack of blades is inserted in the holding frame. Roughly calculated, the section or length (K) along each blade for application of adhesive at least required for each blade end can be determined according to the formula:

$$K = F/2 \cdot C \cdot B$$

There have proved satisfactory hardenable adhesive substances having shearing strengths in the range of from about 30–90 N/mm$^2$, since they as a rule make possible significant sections for application of adhesive with the common tension forces and width of the pack of blades.

The above and other, objects, features and advantages of the invention will be readily understood from the following detailed description thereof, which is to be read in connection with the accompanying drawings.

DETAILED DESCRIPTION OF A PREFERRED EMBODIMENT

Figure 1:
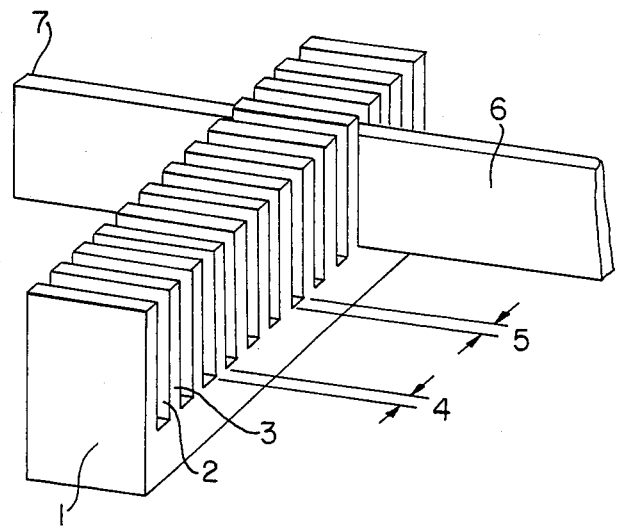
FIG. 1 is a perspective view of a comb-like jig for aligning the blade ends according to the present invention.

Referring to the drawings in detail, and initially to FIG. 1 thereof, a comb-like jig 1 made, for example, of fine steel has a rectangular cross-section formed with a series of interleaved recesses 2 and tenons 3. The thickness 4 of each tenon 3 corresponds to the desired spacing of the blades in a pack of blades 6 (only one being shown in FIG. 1) and the width 5 of each recess 2 corresponds to the thickness of the blades 6 themselves. The blades 6 are successively or simultaneously inserted and conveniently aligned in recesses 2, as shown, so that the ends 7 of all of the blades uniformly project out of the jig by at least a section which can be adhesively fixed.

Thereafter, the spaces between the projecting sections of the blade ends can be filled in with the adhesive agent provided for fixing the positions thereof, for example, by immersion, pouring over or coating of the adhesive agent. It has proved desirable to surround the aligned sections of the blade ends 7, while the latter are being fixed, with preferably connectable molding elements, which have adequately shaped recesses for accommodating the blade ends 7 and the adhesive fixing agent while the outer shape, thereof is configured, as a square block or cylinder, to allow for incorporation of the molding elements with precise fitting in the holding frame. For instance, connected molding elements can be filled with the fixing agent provided and the aligned blade ends 7 are immersed in the fixing agent in the molding elements in a perpendicular position, to a predetermined depth, and maintained in this position until the fixing agent hardens. During this process, the fixing agent, as a result of capillary forces in the interspaces of the blades, often rises upwardly and thus enlarges the surface for the adhesive. It is also possible first to surround the blade ends, already pretreated with a fixing agent, with the molding elements, and only then fill the molding elements with fixing agent in order definitely to fix the blade ends 7 to each other, while simultaneously connecting them with the molding elements.

Figure 2:
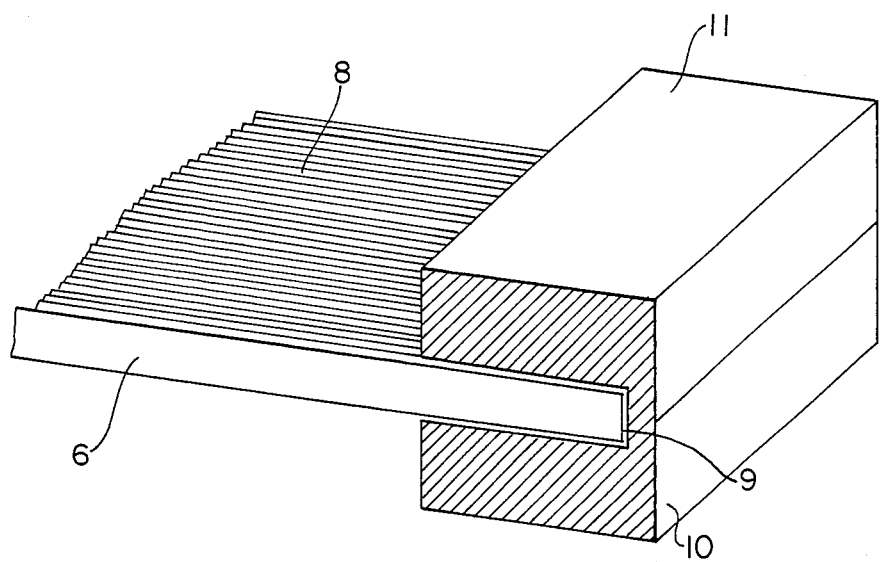
FIG. 2 is a perspective view of a portion of a cemented pack of blades with a special molding in the area of the blade ends.

FIG. 2 shows, by way of example, the construction of a blade end area as a square ledge adequate for accommodating the clamping jaw of the holding frame. The pack of blades 8 consisting of a plurality of blades 6 extends by its end area into the recess 9 of the molding element composed of the two L-shaped, partial elements 10 and 11 and shaped as a square ledge. The fixing agent that constitutes the interconnection between the blade ends 7 and the molding elements in this device is not explicitely shown herein.

Thus, there exist multiple possibilities of shaping the pack of blades at both ends in a manner such that it can be easily adapted and clamped in the holding frame. Those packs of blades often can also be used, without need of laborious alteration, in holding frames provided for traditional packs of blades that have small spacer plates. But adequate holding frames can also be constructed in a comparatively simpler manner, since they need no lateral press screws for the friction-locking fixing of the blades and small spacer plates, and allow additional tolerances and less surface finish even in the clamping jaws. The packs of blades obtainable by the process according to the invention thus offer, together with the reasonable cost and less laborious production, the advantages of easy manipulation and increased cutting precision.

The invention is explained below in more detail with reference to the following example.

EXAMPLE

For use in a commercial lap cutting machine, a pack of blades was to be prepared which was suitable for the cutting of polycrystalline silicon blocks. 200 blades of fine steel (length 430 mm, height 6.35 mm, width 0.254 mm) were spaced at a distance of 0.58 mm (corresponding to a wafer thickness of about 0.450 mm) and were to be held with a tension force of 2100N per blade. A cold setting adhesive based on epoxy resin, and having a shearing strength of up to 40 N/mm$^2$, was provided as the hardenable adhesive substance.

The necessary section K for application of adhesive per blade end 7 was calculated roughly with the aid of the following formula:

$$K = \frac{F}{2 \cdot C \cdot B} = \frac{420 \cdot 10^3}{2 \cdot 40 \cdot 167} = 31 \text{ mm}$$

In this formula, K is the section or length along each blade for application of adhesive (mm), C is the shearing strength of the adhesive (N/mm$^2$), B is the width of the pack of blades (mm), and F is the total tension force (N) on the pack of blades.

The blades were then successively inserted by hand in an assembling jig of tempered steel shaped according to FIG. 1, with a cross-sectional dimension of 40×40 mm$^2$, a length of approximately 167 mm ((0.58+0.254)200) corresponding to the width of the pack of blades 8, and 200 equidistant rectangular recesses 2 of a depth of 7 mm and of a width equal to the width of the blade (0.254 mm), a plus tolerance of about 5 μm being regarded as admissible. As a rule, this tolerance value does not lead to any clear impairment of the cutting precision; but in general, there should be as precise as possible a coincidence between the width of the blade 6 and that of the recess 2.

The blade ends 7 were then aligned so as to project uniformly about 50 mm out of the assembling jig. The blade ends were then inserted about 35 mm into the hollow square recess 9 of a molding element of fine steel in the shape of a square ledge and comprised of two symmetric half shells 10 and 11. These blades were brought to an approximately perpendicular position, the lower most hollow mold 10 of the molding element was filled with a flowable, cold setting adhesive and allowed to set for about 60 minutes. The assembling jig 1 was then moved to the opposite blade ends, which were then fixed in the same manner.

The pack of blades thus obtained was then introduced and clamped in an adequate holding frame. After insertion in the lap cutting machine, it was possible, following a conventional process, as taught, for example, by German Pat. DE-OS No. 27 22 782, to cut a polycrystalline silicon block (measurements 100×100×180 mm$^3$) into 199 wafers, each having a thickness of about 450 μm.

Having described a specific preferred embodiment of the invention with reference to the accompanying drawings, it will be appreciated that the present invention is not limited to that precise embodiment, and that various changes and modifications can be made therein by one of ordinary skill in the art without departing from the scope or spirit of the invention as defined by the appended claims.

What is claimed is:

1. A method of producing packs of blades used for cutting crystal bars into wafers, comprising the steps of:
    (a) aligning end portions of said blades at one end of said pack of blades a predetermined distance apart by snugly and accurately fitting said blades in a plurality of recesses defined by linearly arranged, spaced apart comb-like tenons formed as a unitary structure with a jig, with the tenons each having a thickness corresponding to a desired spacing between the blades;
    (b) securing said end portions together by means of a hardenable adhesive including the step of applying said adhesive to at least a section K of each blade in accordance with the formula $$K = F/(2 \cdot C \cdot B)$$

where C is the shearing strength of said hardenable adhesive, B is the width of said pack of blades and F is the total tension force on said pack of blades;
    (c) removing said jig after said end portions have been locked together; and
    (d) repeating steps (a) through (c) for end portions of said blades at the opposite end of said pack of blades with the same jig.

2. A method according to claim 1; further including the step of surrounding said end portions with molding elements prior to said step of securing.

* * * * *